(12) United States Patent
Janus

(10) Patent No.: US 6,333,691 B1
(45) Date of Patent: Dec. 25, 2001

(54) MOTION DETECTOR

(76) Inventor: Dietmar Janus, Germersheimer Strasse 51, D-90469 Nürnberg (DE)

( * ) Notice: Subject to any disclaimer, the term of this patent is extended or adjusted under 35 U.S.C. 154(b) by 0 days.

(21) Appl. No.: 09/554,213

(22) PCT Filed: Oct. 2, 1998

(86) PCT No.: PCT/EP98/06292

§ 371 Date: May 11, 2000

§ 102(e) Date: May 11, 2000

(87) PCT Pub. No.: WO99/24847

PCT Pub. Date: May 20, 1999

(30) Foreign Application Priority Data

Nov. 12, 1997 (DE) ............................................ 197 49 991

(51) Int. Cl.⁷ ................................................. G08B 13/18
(52) U.S. Cl. ........................ 340/552; 340/553; 340/554
(58) Field of Search ................................. 340/550, 552, 340/553, 554, 561, 567, 10.34, 10.51, 505, 935, 941; 342/20, 27, 28, 105

(56) References Cited

U.S. PATENT DOCUMENTS

| | | | |
|---|---|---|---|
| 3,673,590 | 6/1972 | Corvi et al. | 340/554 |
| 3,716,854 | 2/1973 | Charlot | 342/27 |
| 3,801,977 | * 4/1974 | Cotter | 367/94 |
| 3,838,424 | * 9/1974 | Goldfischer | 342/105 |
| 4,027,303 | * 5/1977 | Neuwirth et al. | 340/552 |
| 4,107,684 | * 8/1978 | Watson, Jr. | 340/552 |
| 4,791,420 | * 12/1988 | Baba | 340/554 |

FOREIGN PATENT DOCUMENTS 39 22 165   1/1991   (DE) .

* cited by examiner

*Primary Examiner*—Van T. Trieu
(74) *Attorney, Agent, or Firm*—Browdy and Neimark

(57) ABSTRACT

The invention relates to a motion detector or proximity switch for detecting moving objects, wherein a high frequency electromagnetic radiation is generated by a free running oscillator and transmitted via a transmitter antenna. The transmitter antenna detects the Doppler modified radiation reflected by the moving object as a function of its phase position or amplitude variation. The radiation is compared with the transmitted radiation parameters in an evaluation device with a view to producing an output signal. The inventive detector is characterized in that it included a free running oscillator having a feedback guaranteed by at least one transmitter antenna ANT RX and at least one receiver antenna ANT TX which are oriented towards the object and coupled via a side or leakage radiation.

6 Claims, 3 Drawing Sheets

MOTION DETECTOR

CROSS REFERENCE TO RELATED APPLICATION

The present application is the national stage under 35 U.S.C. 371 of PCT/EP98/06292, filed Oct. 2, 1998.

BACKGROUND OF THE INVENTION

1. Field of the Invention

The invention relates to a motion detector or proximity switch for detecting moving objects, wherein a high-frequency electromagnetic radiation is produced via a freely oscillating oscillator and is emitted via a transmitting antenna, and the radiation reflected from the moving object and modified due to the Doppler effect is detected with regard to change in its phase angle or amplitude via a receiving antenna and is compared in an evaluation device with the parameters of the emitted radiation for the production of an output signal,.

2. Background Art

Motion detectors of the type in question are used, for example, for spatial monitoring. They serve accordingly as a type of proximity switch. They are used, for example, as automatic door openers, which detect the approach of a person and generate a signal triggering a control signal to the door opening device.

Motion detectors are also known which automatically switch on the lighting in the exterior region of houses and internal spaces as people approach.

In other applications it is proposed to use motion detectors for spatial monitoring in conjunction with alarm systems.

Many known motion detectors work on the basis of light barriers or by detecting infrared radiation emitted by people. Both methods have the disadvantage, particularly for use as alarm systems, that they can be easily recognized due to the required construction size and can accordingly therefore also be manipulated. Furthermore, the known methods have the inherent disadvantage that they are sensitive to light and temperature, making them prone to faults and only usable under certain conditions.

Motion detectors are also already known which work by using the Doppler effect. DE 39 22 165 A1 describes, for example, a Doppler radar sensor which is arranged as a planar circuit on a substrate with an antenna on the top of the substrate and an evaluation unit connected after the sensor. The sensor emits continuous or pulsed signals in the microwave range (3 to 30 gigahertz) via an antenna. These signals are reflected by objects moved in the radiation field and, displaced by the Doppler frequency, picked up again by the antenna and detected by the evaluation unit.

Up until now motion detectors of the type described were used as separate apparatus on doors, walls or ceilings due to their mode of construction. For this reason they are often exposed to manipulation, deliberate damage or even destruction. Moreover, conventional motion detectors of the type in question have a very high power requirement, being dependent on a continuous power supply, an emergency power supply, if available, being only temporarily available, e.g. from a battery or an accumulator.

SUMMARY OF THE INVENTION

Following on from this, the object of the invention is to design a motion detector of this type so that it has a flat and compact construction and accordingly can be arranged in such a way that it is protected from manipulation, deliberate damage or destruction.

According to the invention this object is achieved in a motion detector comprising a freely oscillating oscillator of which the feedback is guaranteed via at least one transmitting antenna ANT RX and at least one receiving antenna ANT TX, which are orientated in the direction of the object and are coupled via lateral radiation or radiation leakage.

The circuit according to the invention is distinctive in that it reacts particularly sensitively even in the case of relatively low object speeds, compared to the conventional Doppler radar principle. It can be constructed very compactly and has an extremely low energy requirement, so new fields of application are possible in which operation is by battery or accumulator or energy sources such as solar cells.

Interference by the material surrounding the motion sensor is prevented by an advantageously selected frequency in the microwave range. The radiation of this wavelength penetrates materials such as glass, ceramics, plastics, masonry, wood and perforated metal without significant loss, so a motion detector of this type can also be hidden behind these materials or can be arranged in a casing made from these materials, optionally designed unobtrusively.

A motion detector of the type in question is accordingly suited as an alarm to prevent unauthorized removal of suitcases, handbags, beach bags and bicycles and for securing electrical and electronic devices. An alarm signal can be triggered, for example, by the approach of an unauthorized person, while this alarm is suppressed in the case of an authorized person equipped with an electronic signal transmitter. If this authorized person leaves the detection range of the sensor protecting the electronic device, the accessibility of data and information is automatically suppressed.

An advantageous embodiment of the invention is described in more detail hereinafter with reference to the drawings.

DESCRIPTION OF THE PREFERRED EMBODIMENT

Figure 1:
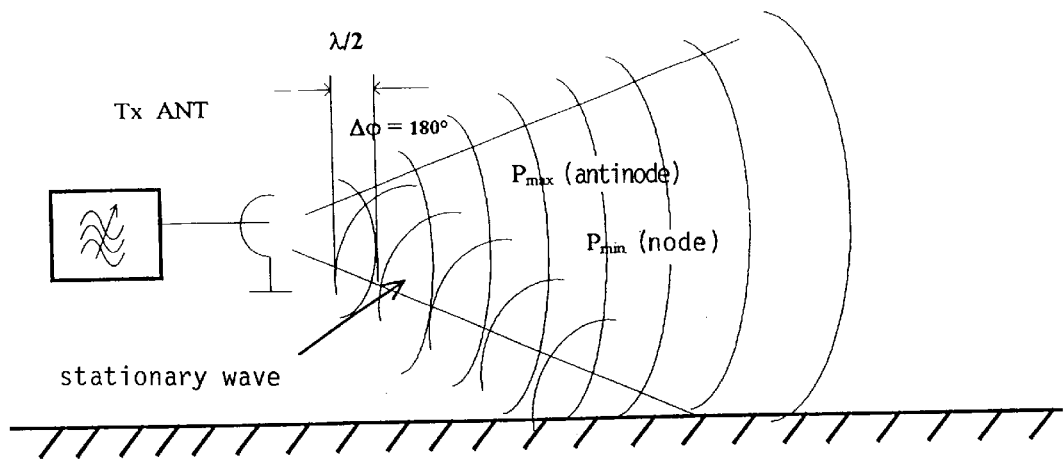
FIG. 1 shows the formation of a stationary wave with superposition of a ground wave to explain the physical bases of the invention.
Figure 2:
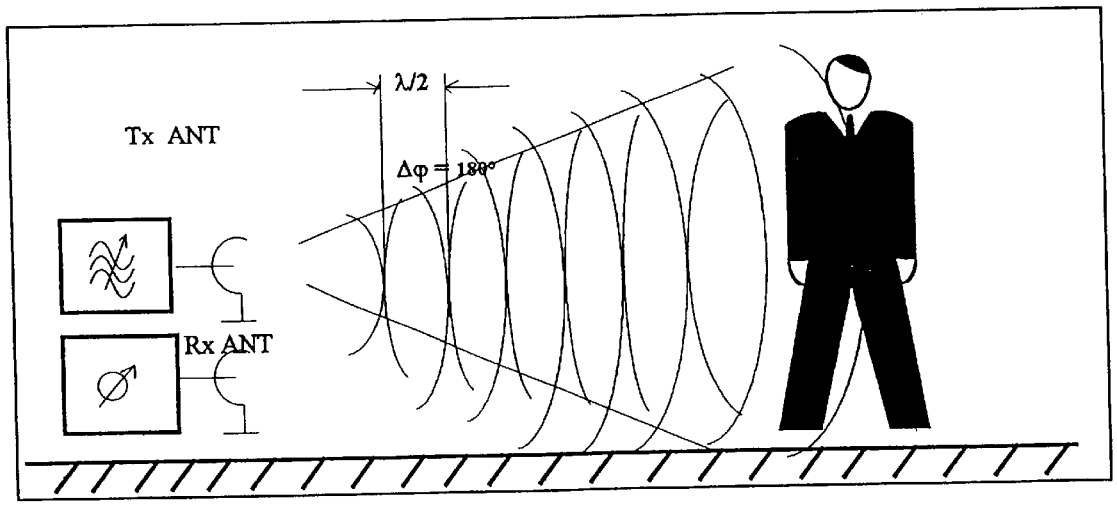
FIG. 2 shows the formation of a stationary wave with the superposition of a reflecting wave from a stationary object.

FIGS. 1 and 2 show that an electromagnetic wave produces, in its radiation in the direction of various objects, a multiplicity of reflections, the fronts of which have different phase angles to the output wave. A superposition of these waves builds an interference field, the strength of which depends on the distance from the radiating antenna. This interference field has characteristic field strength antinodes and field strength nodes, the spacing of which is half the wavelength ($\lambda/2$) in the case of a single output wave in a single reflected wave.

Figure 3:
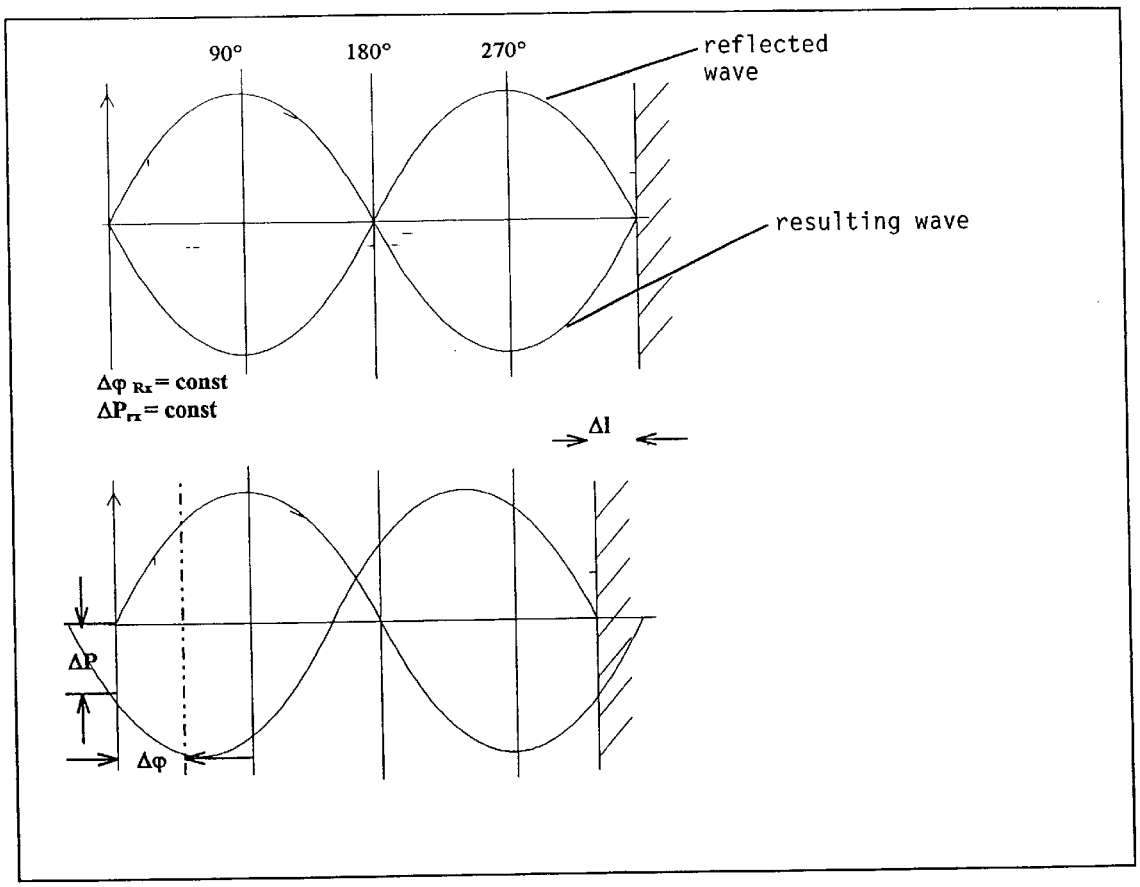
FIG. 3 illustrates the change of phase and amplitude due to the Doppler effect.

FIG. 3 shows that the interference field changes with a movement of the radiated objects, and therefore the position of the antinodes and nodes also changes. If one wishes to detect the motion of an object in the reception range of the antenna, the measured variables amplitude, phase and frequency are available.

Figure 4:
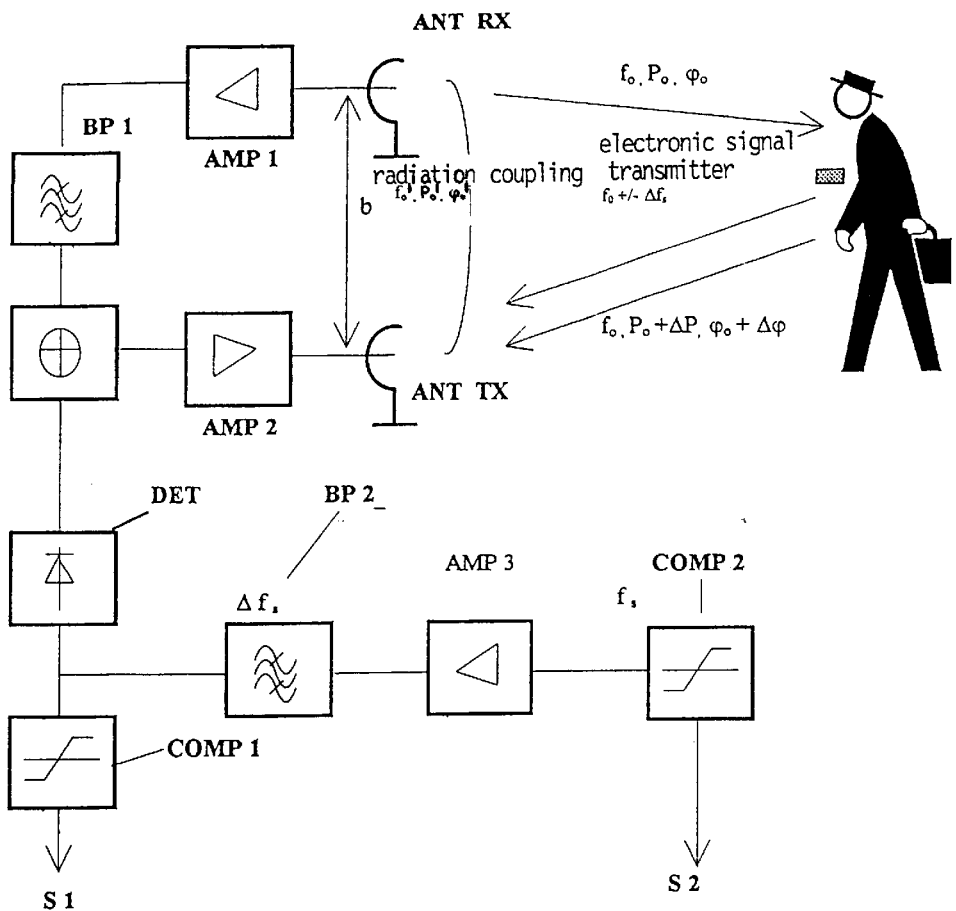
FIG. 4 is a schematic block diagram of an arrangement according to the invention.
Figure 5:
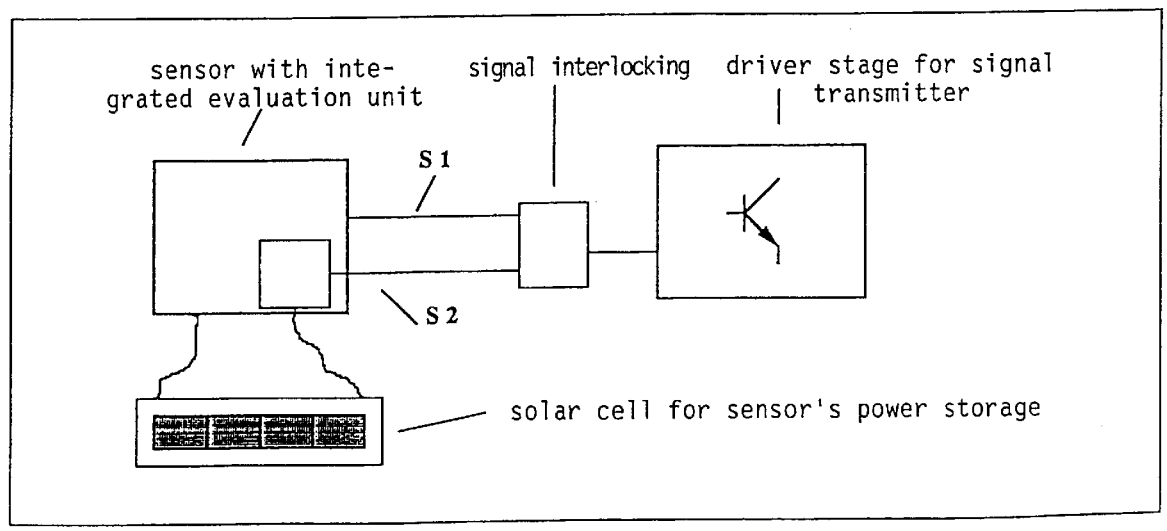
FIG. 5 is a block diagram showing the measured values relevant to the use of the invention by registering the loop parameters of an oscillator with a feed back loop via two antennae.

As shown in FIG. 4, the changed parameters of the reflected wave are detected via an oscillator which oscillates freely, the feedback, or coupling, loop of which is via two antennae. The oscillation produced by the oscillator with the frequency $f_0$, the amplitude $P_0$ and the phase $\varphi_0$ is radiated in the direction of the object by means of a transmitting antenna. A part of the energy with reference $f_0$, $P_0'$ and $\varphi_0'$ is simultaneously radiated into the receiving antenna by radiation coupling.

This meets the amplitude condition and phase condition of an oscillator. Within its operating range, the oscillator reacts to changes by means of the reflected wave and thus changes its amplitude, phase and frequency.

The spacing b between the antennae determines the antennae aperture of the system, the power in the loop and the operating point of the detector. The sensitivity of the system and thus its range is determined by the aperture of the antennae and the power supplied in the loop.

The wave $f_0$, $P_0+\Delta P$, $\varphi_0+\Delta_\varphi$ reflected from the moving object is compared in a mixer element and a detector element with the reference $f_0' P_0' \varphi_0'$. As a result, there arises a physical measured variable $\Delta P$ or $\Delta_\varphi$ which is generated by the comparator COMP1.

These measured variables can be evaluated according to the individual application. The amplitude difference $\Delta P$ and the phase difference $\Delta_\varphi$ can both be used. Via a second circuit with a low-frequency bandpass BP2 and a subsequent comparator COMP2, a coded signal $F_0+/-\Delta f_s$ reflected by an electronic signal transmitter can be evaluated.

What is claimed is:

1. A motion detector or proximity switch for detecting moving objects, a high-frequency electromagnetic being produced via a freely oscillating oscillator and being emitted via a transmitting antenna, and the radiation reflected from the moving object and modified due to the Doppler effect being detected with regard to change in its phase angle or amplitude via a receiving antenna and being compared in an evaluation device with the parameters of the emitted radiation for the production of an output signal, wherein it comprises a freely oscillating oscillator that comprises at least one transmitting antenna ANT RX and at least one receiving antenna ANT TX, which are orientated in the direction of the object and are positioned relative to one another to cause a part of the radiation emitted by the transmitting antenna to be radiated directly into the receiving antenna in order to produce electrical oscillations.

2. A motion detector according to claim 1, wherein there is provided in the oscillator loop, at least one bandpass BP1 consisting of one or a plurality of resonators for producing the phase conditions in the feedback loop and for limiting the frequency to a predetermined frequency band.

3. A motion detector according to claim 1, wherein in a coupling loop there is provided a non-linear element for mixing a reference signal with a measuring signal, the reference signal being coupled via the radiation radiated directly into the receiving antenna from the transmitting antenna and the measuring signal being formed from the reflected radiation.

4. A motion detector according to claim 3, wherein after the non-linear element, a second, low frequency bandpass BP2 is connected to allow the production of a direct current-free signal component from the reflected signal spectrum, the direct current-free signal component being used for the reception of a correspondingly coded message from an electronic signal transmitter.

5. A motion detector according to claim 1 wherein the part of the radiation emitted by the transmitting element to be radiated directly into the receiving antenna is radiated in a direction that extends directly from the transmitting antenna to the receiving antenna without being influenced by an object to be detected, and further wherein a second part of the radiation emitted by the transmitting antenna is emitted in a direction to be reflected from the moving object, which direction is different from the direction that is directly between the transmitting antenna and the receiving antenna.

6. A motion detector according to claim 1 wherein the part of the radiation emitted by the transmitting antenna to be radiated directly into the receiving antenna is radiated into the receiving antenna independently of whether radiation front the transmitting antenna is being reflected from a moving object.

* * * * *